US012614671B2

(12) United States Patent
Muto et al.

(10) Patent No.: US 12,614,671 B2
(45) Date of Patent: Apr. 28, 2026

(54) DIELECTRIC CERAMIC COMPOSITION AND SINGLE LAYER CAPACITOR

(71) Applicant: TDK CORPORATION, Tokyo (JP)

(72) Inventors: Kazuya Muto, Tokyo (JP); Shinichi Sasaki, Tokyo (JP); Akira Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 736 days.

(21) Appl. No.: 17/994,488

(22) Filed: Nov. 28, 2022

(65) Prior Publication Data

US 2023/0260702 A1      Aug. 17, 2023

(30) Foreign Application Priority Data

Feb. 14, 2022      (JP) ................................. 2022-020711

(51) Int. Cl.
H01G 4/12                (2006.01)

(52) U.S. Cl.
CPC ................................. H01G 4/1227 (2013.01)

(58) Field of Classification Search
CPC ...... H01G 4/1227; H01G 4/33; H01G 4/1218; C04B 35/4682; C04B 2235/5445
See application file for complete search history.

(56) References Cited

U.S. PATENT DOCUMENTS

| | | | |
|---|---|---|---|
| 2010/0035748 A1 | 2/2010 | Umeda et al. | |
| 2015/0206660 A1* | 7/2015 | Chai .................... H01G 4/1245 |
| | | | 361/301.4 |

FOREIGN PATENT DOCUMENTS

| | | | |
|---|---|---|---|
| CN | 101691298 A | 4/2010 | |
| CN | 102531593 A | 7/2012 | |
| CN | 102718478 A | 10/2012 | |
| JP | S5176599 A | 7/1976 | |
| JP | 2006-096576 A | 4/2006 | |
| JP | 2006-278615 A | 10/2006 | |
| JP | 2006282483 A | * 10/2006 | |
| JP | 2012-025592 A | 2/2012 | |
| JP | 2013-245150 A | 12/2013 | |
| JP | 2014-001131 A | 1/2014 | |

OTHER PUBLICATIONS

JP2006282483A machine translation (Year: 2006).*
Ghayour, Hamid, and Majid Abdellahi. "A brief review of the effect of grain size variation on the electrical properties of BaTiO3-based ceramics." Powder technology 292 (2016): 84-93. (Year: 2016).*

* cited by examiner

*Primary Examiner* — Amber R Orlando
*Assistant Examiner* — Cameron K Miller
(74) *Attorney, Agent, or Firm* — Oliff PLC

(57) ABSTRACT

A dielectric ceramic composition includes main component grains having a perovskite structure represented by a formula $AMO_3$. "A" includes Ba. "M" includes Ti. D50 of the main component grains is 960 nm or less. D90 of the main component grains is 1460 nm or less.

8 Claims, 3 Drawing Sheets

DIELECTRIC CERAMIC COMPOSITION AND SINGLE LAYER CAPACITOR

The present application claims a priority on the basis of Japanese patent application No. 2022-020711 filed on Feb. 14, 2022, which is incorporated herein by reference in its entirety.

TECHNICAL FIELD

The present invention relates to a dielectric ceramic composition and an electronic device.

BACKGROUND

For example, Japanese Laid-Open Patent Publication No. S51-76599 discloses a dielectric ceramic composition including manganese oxide, niobium oxide, and bismuth oxide to achieve high permittivity. Japanese Laid-Open Patent Publication No. S51-76599 states that the dielectric has a good loss angle at 16 KHz, 800 Vrms/mm, and 50° C. Unfortunately, voltage characteristics of capacitance have not been examined in Japanese Laid-Open Patent Publication No. S51-76599.

SUMMARY

The present invention has been achieved under such circumstances. It is an object of the invention to provide a dielectric ceramic composition having good voltage characteristics of capacitance.

A dielectric ceramic composition according to the present invention includes main component grains having a perovskite structure represented by a formula $AMO_3$, wherein "A" includes Ba, "M" includes Ti, D50 of the main component grains is 960 nm or less, and D90 of the main component grains is 1460 nm or less.

The dielectric ceramic composition according to the present invention can have good voltage characteristics of capacitance. This means that the dielectric ceramic composition can have a small absolute value of the rate of change of capacitance (rate of change of capacitance with respect to voltage (VC)) within a predetermined range of voltages.

D50 of the main component grains is preferably 330 to 960 nm.

This enables the dielectric ceramic composition to have good temperature characteristics of capacitance. This means that the dielectric ceramic composition can have a small absolute value of the rate of change of capacitance (rate of change of capacitance with respect to temperature (TC)) within a predetermined range of temperatures.

The dielectric ceramic composition according to the present invention preferably includes 0.01 to 4 parts by mol of a second subcomponent with respect to 100 parts by mol of "M" in terms of a metal element; and the second subcomponent preferably includes at least one selected from the group consisting of Sm, Nd, La, Dy, Ce, Pr, Eu, Y, Gd, Tb, Ho, Er, Tm, and Yb.

This enables the dielectric ceramic composition to have good temperature characteristics of capacitance.

In the dielectric ceramic composition according to the present invention, the second subcomponent may include at least one selected from the group consisting of Sm, Nd, La, Dy, Ce, Pr, and Eu.

The dielectric ceramic composition according to the present invention preferably includes 0.01 to 2 parts by mol of the second subcomponent with respect to 100 parts by mol of "M" in terms of a metal element.

This enables the dielectric ceramic composition to have better temperature characteristics of capacitance.

The dielectric ceramic composition according to the present invention preferably includes 0 to 10 parts by mol of a first subcomponent with respect to 100 parts by mol of "M" in terms of a metal element; and the first subcomponent preferably includes at least one selected from the group consisting of Nb, Ta, Mo, W, Sn, Bi, and Mg.

The dielectric ceramic composition can maintain good relative permittivity by including 0 to 10 parts by mol of the first subcomponent in terms of a metal element. When too much amount of the first subcomponent is included, the relative permittivity of the dielectric ceramic composition tends to decrease.

In the dielectric ceramic composition according to the present invention, the first subcomponent may include at least one selected from the group consisting of Nb, Ta, Mo, W, Sn, and Bi.

An electronic device according to the present invention includes a dielectric layer containing the above-mentioned dielectric ceramic composition.

The electronic device according to the present invention is not limited to particular devices. Examples of the electronic device according to the present invention include a single layer ceramic capacitor or a multilayer ceramic capacitor.

BRIEF DESCRIPTION OF THE DRAWING(S)

DETAILED DESCRIPTION

Ceramic Capacitor 2

Figure 1:
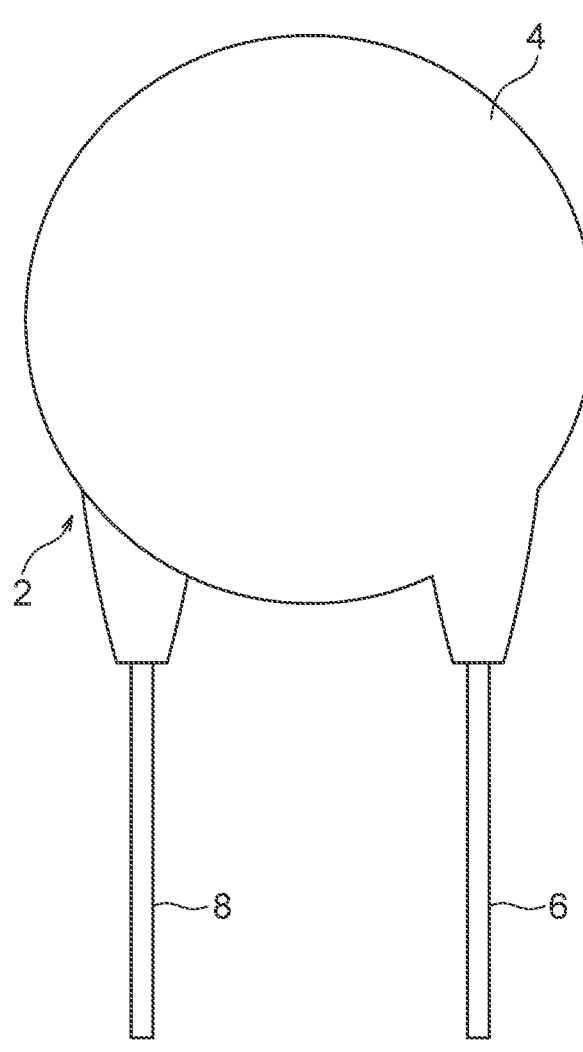
FIG. 1 is a front view of a ceramic capacitor according to an embodiment of the present invention.
Figure 2:
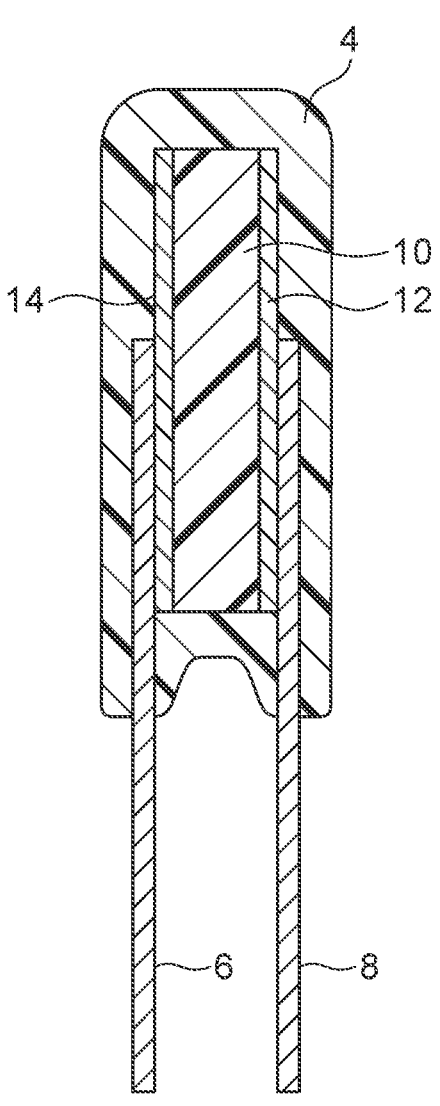
FIG. 2 is a side cross-sectional view of the ceramic capacitor according to the embodiment of the present invention.

FIGS. 1 and 2 show a ceramic capacitor 2 as an example of an electronic device according to the present embodiment. As shown in FIGS. 1 and 2, the ceramic capacitor 2 according to the present embodiment includes a dielectric layer 10, a pair of terminal electrodes 12 and 14 formed on surfaces of the dielectric layer 10 facing each other, and lead terminals 6 and 8 connected to the terminal electrodes 14 and 12 respectively. These constituents of the ceramic capacitor 2 are covered by a protective resin 4.

The shape of the ceramic capacitor 2 is appropriately determined based on the purpose and usage. The ceramic capacitor 2 is preferably a single layer capacitor whose dielectric layer 10 has a disc shape. The size of the ceramic capacitor 2 is appropriately determined based on the purpose and usage. The ceramic capacitor 2 has a diameter of 3 to 20 mm, preferably 5 to 20 mm, and more preferably 5 to 15 mm.

The terminal electrodes 12 and 14 include a conductive material. Examples of the conductive material of the terminal electrodes 12 and 14 include Cu, Cu alloys, Ag, Ag alloys, and In—Ga alloys.

The dielectric layer 10 may have any thickness. The thickness of the dielectric layer 10 is appropriately determined based on the purpose or so, and is preferably 0.1 to 3 mm and more preferably 0.3 to 2 mm. Controlling the thickness of the dielectric layer 10 within this range enables the ceramic capacitor 2 to be suitably used at medium and high voltages.

According to the present embodiment, the capacitor can have a smaller size.

Figure 3:
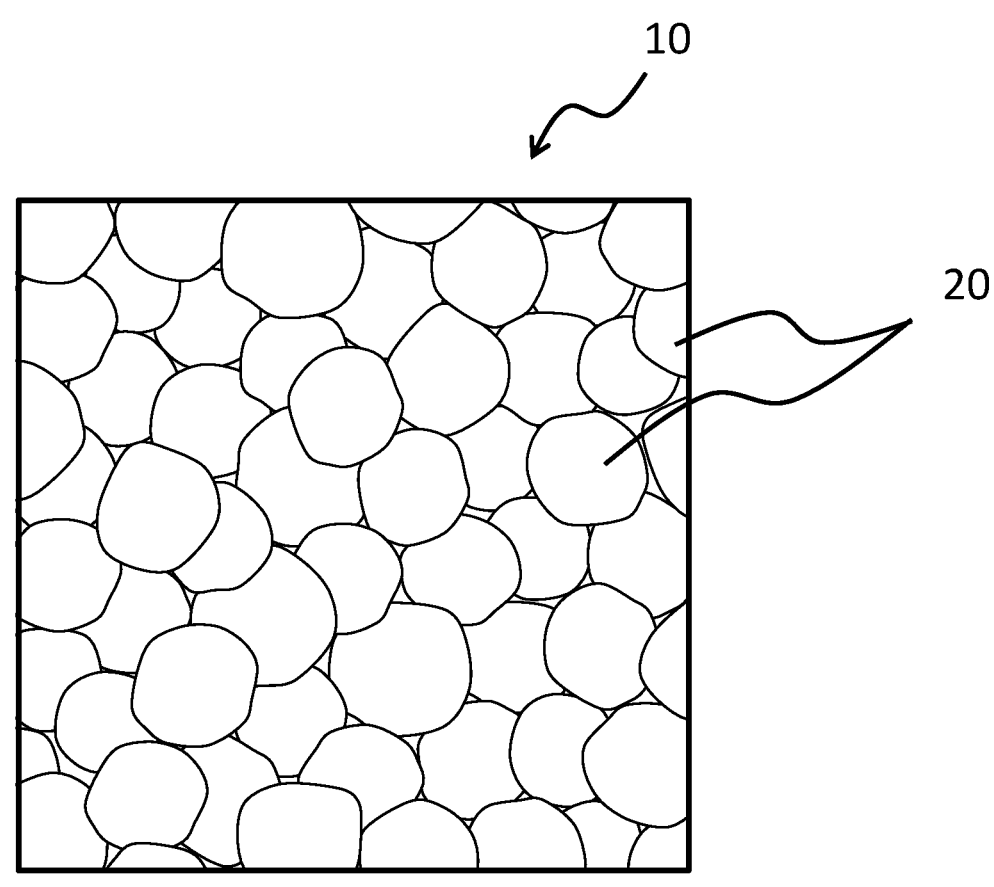
FIG. 3 is a schematic cross-sectional view of a dielectric ceramic composition included in a dielectric layer shown in FIG. 2.

The dielectric layer 10 includes a dielectric ceramic composition according to the present embodiment shown in FIG. 3. The dielectric ceramic composition according to the present embodiment includes main component grains 20 having a perovskite structure represented by a formula $AMO_3$, where "A" is at least one A-site element, "M" is at least one M-site element, and O is oxygen.

The main component of the dielectric ceramic composition means a component occupying 90 mass % or more of the dielectric ceramic composition. The main component grains 20 of the present embodiment are grains including the main component. A subcomponent may be solid-soluted in the main component grains 20, or the main component grains 20 may have a core-shell structure with the main component and the subcomponent.

"A" includes Ba. "A" may include Ca and/or Sr in addition to Ba.

"M" includes Ti. "M" may include Zr in addition to Ti.

D50 of the main component grains 20 according to the present embodiment is 960 nm or less, preferably 330 to 960 nm, and more preferably 500 to 900 nm.

D50 is the corresponding grain size at a cumulative frequency of 50% when ordered from the smallest grain size.

D90 of the main component grains 20 according to the present embodiment is 1460 nm or less and preferably 1350 nm or less.

D90 is the corresponding grain size at a cumulative frequency of 90% when ordered from the smallest grain size.

As described above, the variation among the grain sizes of the main component grains 20 according to the present embodiment is small.

The dielectric ceramic composition according to the present embodiment may include a first subcomponent. The first subcomponent preferably includes at least one selected from the group consisting of Nb, Ta, Mo, W, Sn, Bi, and Mg, and more preferably includes at least one selected from the group consisting of Nb, Ta, Mo, W, Sn, and Bi.

The dielectric ceramic composition according to the present embodiment preferably includes 0 to 10 parts by mol of the first subcomponent with respect to 100 parts by mol of "M" in terms of a metal element.

The dielectric ceramic composition according to the present embodiment preferably includes a second subcomponent. The second subcomponent preferably includes at least one selected from the group consisting of Sm, Nd, La, Dy, Ce, Pr, Eu, Y, Gd, Tb, Ho, Er, Tm, and Yb, and more preferably includes at least one selected from the group consisting of Sm, Nd, La, Dy, Ce, Pr, and Eu.

The dielectric ceramic composition according to the present embodiment preferably includes 0.01 to 4 parts by mol and more preferably includes 0.01 to 2 parts by mol of the second subcomponent with respect to 100 parts by mol of "M" in terms of a metal element.

The dielectric ceramic composition according to the present embodiment preferably includes a third subcomponent. The third subcomponent includes Fe and Mn.

In the present embodiment, the molar ratio (Mn/(Fe+Mn)) of Mn to the total of Fe and Mn in terms of the metal elements is preferably 0.18 to 0.65.

Method of Manufacturing Ceramic Capacitor

Next, a method of manufacturing the ceramic capacitor will be explained.

First, a dielectric ceramic composition powder to be the dielectric layer 10 shown in FIG. 2 after firing is manufactured.

Raw materials of the main component and raw materials of the first to third subcomponents are prepared. Any raw materials may be used as the raw materials of the main component. The raw materials of the main component can be appropriately selected from, for example, oxides and complex oxides of the elements of the main component, or various compounds (e.g., carbonate, nitrate, hydroxide, and organic metal compounds) to be these oxides or complex oxides by firing. For example, $BaCO_3$ and $TiO_2$ can be used as the raw materials of the main component.

Although the raw materials of the main component may be manufactured by a solid phase method or a liquid phase method (e.g., a hydrothermal synthesis method and an oxalate method), the raw materials of the main component are preferably manufactured by the solid phase method in terms of manufacturing costs.

The molar ratio ("main component raw material A/M") of "A" to "M" of the raw materials of the main component is not limited to particular values. The molar ratio is, for example, 0.990 to 1.005.

Any raw materials may be used as the raw materials of the first to third subcomponents. The raw materials of the first to third subcomponents can be appropriately selected from, for example, oxides and complex oxides of the elements of the subcomponents, or various compounds (e.g., carbonate, nitrate, hydroxide, and organic metal compounds) to be these oxides or complex oxides by firing.

As for a method of manufacturing the dielectric ceramic composition according to the present embodiment, first, the raw materials of the main component, or the raw materials of the main component and the raw materials of the subcomponents are prepared. Because D50 and D90 of the main component grains of the present embodiment are equivalent to or smaller than the predetermined values, the raw materials of the main component preferably have relatively small particle sizes. The raw materials of the main component, or the raw materials of the main component and the raw materials of the subcomponents are mixed, and then mixed in wet manner with a ball mill or so using zirconia balls or the like.

The mixture is granulated and shaped, and the shaped material is calcined in air to give a calcined powder. As for the calcining conditions, for example, the calcining temperature is preferably 1100 to 1300° C. and more preferably 1150 to 1250° C.; and the calcining time is preferably 0.5 to 4 hours.

Next, the calcined powder is pulverized in wet manner with a ball mill or so and is mixed with the raw materials of any remaining subcomponents, and the mixture is dried to give the dielectric ceramic composition powder. Manufacturing the dielectric ceramic composition powder by the solid phase method as described above can reduce manufacturing costs while ensuring desired characteristics.

Next, an appropriate amount of a binder is added to the dielectric ceramic composition powder for granulation. The granulated material is pressed into a disc shape having a predetermined size to give a green compact. The green compact is fired to give a sintered body of the dielectric ceramic composition. Firing may be performed under any conditions. The holding temperature is preferably 1100 to 1400° C. and more preferably 1200 to 1300° C. The firing atmosphere is preferably air.

On main surfaces of the sintered body of the dielectric ceramic composition, terminal electrodes are printed and baked as necessary to form the terminal electrodes 12 and 14. Then, the lead terminals 6 and 8 are joined to the terminal electrodes 14 and 12 respectively by soldering or so. Lastly, the element body is covered by the protective resin 4. This gives the single layer ceramic capacitor 2 shown in FIGS. 1 and 2.

The single layer ceramic capacitor 2 according to the present embodiment manufactured as described above is to be mounted on a printed circuit board or the like via the lead terminals 6 and 8 and used in various electronics.

The dielectric ceramic composition according to the present embodiment can have good voltage characteristics of capacitance at a high voltage.

Conventionally, the capacitance or the like of medium and high voltage ceramic capacitors recorded in their specifications have been measured at several volts and at 1 kHz. However, these ceramic capacitors are sometimes used at several hundred volts. When a voltage higher than several volts is applied to the capacitors, their capacitance becomes dependent on the voltage. This dependence is characteristic of ferroelectric ceramics. Thus, the capacitance measured at several hundred volts is larger than the capacitance measured at several volts. As a result, at several hundred volts, a current in an AC circuit may be larger, and a large-amplitude alternating current may be larger. In other words, ferroelectric ceramics may have a large large-amplitude alternating current, because their capacitance is highly dependent on voltage. Note that the large-amplitude alternating current is commonly known by leakage current.

In contrast, the dielectric ceramic composition according to the present embodiment can have good voltage characteristics of capacitance. It is because the dielectric ceramic composition includes the main component grains having the perovskite structure represented by the formula $AMO_3$, where "A" includes Ba and "M" includes Ti; D50 of the main component grains is 960 nm or less; and D90 of the main component grains is 1460 nm or less. In other words, the capacitance of the dielectric ceramic composition according to the present embodiment can be less dependent on voltage. Thus, the dielectric ceramic composition according to the present embodiment can have a reduced leakage current.

The medium and high voltage ceramic capacitors may be used at any voltage and are used at, for example, 100 to 2000 V. According to the present embodiment, the voltage characteristics of capacitance are good especially at such high voltages (100 to 2000 V).

Hereinabove, one embodiment of the present invention has been explained, but the present invention is not to be limited to the embodiment in any way, and the present invention can be carried out in various different embodiments within the scope of the present invention.

For example, while the above-mentioned embodiment exemplifies a single layer ceramic capacitor having one dielectric layer as an electronic device, an electronic device according to the present invention is not limited to a single layer ceramic capacitor and may be a multilayer ceramic capacitor manufactured by a normal printing method or sheet method using a dielectric paste including the above-mentioned dielectric ceramic composition and an electrode paste.

Examples

Hereinafter, the present invention will be explained based on more detailed examples, but the present invention is not limited to the examples.

$BaCO_3$ and $TiO_2$ were prepared as raw materials of the main component and mixed in wet manner with a ball mill using purified water as a solvent and zirconia balls.

Next, the mixture was dried. Then, 5 mass % of water was added to the mixture for granulation and shaping. The shaped material was calcined at 1150° C. for two hours in air. The calcined material was coarsely pulverized with a pulverizer and passed through meshes to give a milled powder. First to third subcomponents weighed to satisfy a composition shown in Tables 1 and 3 were added to the milled powder, and the mixture was pulverized in wet manner and dried. This gave a dielectric ceramic composition powder having a composition shown in Tables 1 and 3.

With respect to 100 parts by mass of the dielectric ceramic composition powder, 10 parts by mass of a polyvinyl alcohol aqueous solution was added. Then, the mixture was granulated and passed through meshes to give a granulated powder. The granulated powder was pressed at 396 MPa to give disc-shaped green compacts having a diameter of 16.5 mm and a thickness of about 1.2 mm.

The green compacts were fired at 1200 to 1300° C. for two hours in air to give disc-shaped sintered bodies.

A Cu electrode paste was applied to both main surfaces of each sintered body (dielectric layer 10) and baked at 800° C. for 10 minutes in a reducing atmosphere to give disc-shaped ceramic capacitor samples as shown in FIGS. 1 and 2. The dielectric layer 10 of each capacitor sample had a thickness of about 1 mm. The baked electrodes had a diameter of 12 mm.

D50, D90, the relative permittivity, the dielectric loss, the insulation resistance, the rate of change of capacitance with respect to temperature, and the rate of change of capacitance with respect to voltage of the capacitor sample were evaluated as follows. In addition, the AC breakdown electric field was also evaluated for Sample Nos. 32 to 36. Tables 2 and 4 show the results of evaluation.

D50 and D90

A cross section of the sintered body (dielectric layer 10) was observed with an electron microscope to measure the cross-sectional area of each main component grain and give a distribution of the cross-sectional area. Using the cross-sectional area, an equivalent circular diameter was derived, and further the volume of a corresponding sphere was derived. The corresponding equivalent circular diameter at a cumulative frequency of 50% of the cumulative distribution of the volume of the sphere was defined as D50, and the corresponding equivalent circular diameter at a cumulative frequency of 90% of the cumulative distribution of the volume of the sphere was defined as D90.

Relative Permittivity (εr) and Dielectric Loss (tan δ)

A signal with a frequency of 1 kHz and an input signal level (measurement voltage) of 1.0 Vrms was applied to the capacitor sample using a digital LCR meter (4278A manufactured by Agilent Technologies) at a reference temperature of 20° C. to measure the capacitance and the dielectric loss. The relative permittivity ε (no unit) was calculated using the measured capacitance. Higher relative permittivity was preferable. In the present examples, a relative permittivity of 1500 or more was deemed good.

Insulation Resistance (IR)

The insulation resistance value was read after DC 500 V was applied to the capacitor sample for 60 seconds using a digital resistance meter (4339B manufactured by Agilent Technologies) at room temperature.

AC Breakdown Electric Field (ACVB)

An AC electric field of 100 V/s was gradually applied to both ends of the capacitor sample to measure the electric field value as of when a leakage current of 100 mA flowed as the AC breakdown electric field (ACVB). A higher value of the AC breakdown electric field was preferable. In the present examples, 5.0 kV/mm or more was deemed good.

Rate of Change of Capacitance with Respect to Temperature (TC)

The capacitance of the capacitor sample was measured at −25° C., 20° C., and 85° C. The rate of change from the capacitance at 20° C. to the capacitance at −25° C. was calculated (rate of change of capacitance with respect to temperature (TC (−25° C.))). The rate of change from the capacitance at 20° C. to the capacitance at 85° C. was also calculated (rate of change of capacitance with respect to temperature (TC (85° C.))). The unit of the rate of change of capacitance with respect to temperature was %. In the present examples, a rate of change of capacitance with respect to temperature of −15% to 15% was deemed good.

Rate of Change of Capacitance with Respect to Voltage (VC)

The capacitance of the capacitor sample was measured under the following three conditions.

(1) 1 kHz, 1 Vrms
(2) 50 Hz, 220 Vo-p/mm
(3) 50 Hz, 1500 Vo-p/mm

The rate of change from the capacitance measured under condition (1) to the capacitance measured under condition (2) was calculated (rate of change of capacitance with respect to voltage (VC (220 V))). The rate of change from the capacitance measured under condition (1) to the capacitance measured under condition (3) was also calculated (rate of change of capacitance with respect to voltage (VC (1500 V))). The unit of the rate of change of capacitance with respect to voltage was %. In the present examples, a VC (220 V) value of 30% or less was deemed good, and a VC (1500 V) value of 70% or less was deemed good.

TABLE 1

| | Amount with respect to 100 parts by mol of "M" in terms of metal element | | | | | | | | | | | | |
| | First subcomponent | | | | | | | Second subcomponent | | | | First sub-component | Second sub-component |
| Sample No. | Nb Part by mol | Mo Part by mol | Ta Part by mol | W Part by mol | Bi Part by mol | Sn Part by mol | Mg Part by mol | Sm Part by mol | Nd Part by mol | La Part by mol | Y Part by mol | total Part by mol | total Part by mol |
|---|---|---|---|---|---|---|---|---|---|---|---|---|---|
| 1 | 2.40 | 0.00 | 0.00 | 0.00 | 0.01 | 0.00 | 0.00 | 0.94 | 0.00 | 0.00 | 0.00 | 2.41 | 0.94 |
| 2 | 1.62 | 0.00 | 0.00 | 0.00 | 0.52 | 0.00 | 0.00 | 0.57 | 0.00 | 0.00 | 0.00 | 2.19 | 0.98 |
| 3 | 2.36 | 0.00 | 0.00 | 0.00 | 0.01 | 0.00 | 0.00 | 0.93 | 0.00 | 0.00 | 0.00 | 2.37 | 0.93 |
| 4 | 2.31 | 0.00 | 0.00 | 0.00 | 0.01 | 0.00 | 0.00 | 0.91 | 0.00 | 0.00 | 0.00 | 2.32 | 0.91 |
| 5 | 2.31 | 0.00 | 0.00 | 0.00 | 0.01 | 0.00 | 0.00 | 0.91 | 0.00 | 0.00 | 0.00 | 2.32 | 0.91 |
| 6 | 0.00 | 0.00 | 0.00 | 0.00 | 0.00 | 0.00 | 1.60 | 0.00 | 0.00 | 0.60 | 1.78 | 1.60 | 2.38 |
| 7 | 0.00 | 0.00 | 0.00 | 0.00 | 0.00 | 0.00 | 1.60 | 0.00 | 0.00 | 0.60 | 1.78 | 1.60 | 2.38 |
| 8 | 0.00 | 0.00 | 0.00 | 0.00 | 0.00 | 0.00 | 1.60 | 0.00 | 0.00 | 0.60 | 1.78 | 1.60 | 2.38 |
| 9 | 0.00 | 0.00 | 0.00 | 0.00 | 0.00 | 0.00 | 1.60 | 0.00 | 0.00 | 0.60 | 1.78 | 1.60 | 2.38 |
| 10 | 0.00 | 0.00 | 0.00 | 0.00 | 0.00 | 0.00 | 1.60 | 0.00 | 0.00 | 0.60 | 1.78 | 1.60 | 2.38 |
| 11 | 2.31 | 0.00 | 0.00 | 0.00 | 0.00 | 0.00 | 0.00 | 4.10 | 0.00 | 0.00 | 0.00 | 2.31 | 4.10 |
| 12 | 0.00 | 0.00 | 0.00 | 0.00 | 0.00 | 0.00 | 1.60 | 0.00 | 0.00 | 0.30 | 1.78 | 1.60 | 2.08 |
| 13 | 0.00 | 0.00 | 0.00 | 0.00 | 0.00 | 0.00 | 1.60 | 0.00 | 0.00 | 0.00 | 1.78 | 1.60 | 1.78 |
| 14 | 0.00 | 0.00 | 0.00 | 0.00 | 0.00 | 0.00 | 1.60 | 0.00 | 0.00 | 0.60 | 0.89 | 1.60 | 1.49 |
| 15 | 0.00 | 0.00 | 0.00 | 0.00 | 0.00 | 0.00 | 1.60 | 0.00 | 0.00 | 0.60 | 0.00 | 1.60 | 0.60 |
| 16 | 2.31 | 0.00 | 0.00 | 0.00 | 0.00 | 0.00 | 0.00 | 0.89 | 0.00 | 0.00 | 0.00 | 2.31 | 0.89 |
| 17 | 2.31 | 0.00 | 0.00 | 0.00 | 0.00 | 0.00 | 0.00 | 0.71 | 0.00 | 0.00 | 0.00 | 2.31 | 0.71 |
| 18 | 2.31 | 0.00 | 0.00 | 0.00 | 0.00 | 0.00 | 0.00 | 0.52 | 0.00 | 0.00 | 0.00 | 2.31 | 0.52 |
| 19 | 2.31 | 0.00 | 0.00 | 0.00 | 0.00 | 0.00 | 0.00 | 0.01 | 0.00 | 0.00 | 0.00 | 2.31 | 0.01 |
| 20 | 2.31 | 0.00 | 0.00 | 0.00 | 0.00 | 0.00 | 0.00 | 0.00 | 0.00 | 0.00 | 0.00 | 2.31 | 0.00 |
| 21 | 0.00 | 0.00 | 0.00 | 0.00 | 0.00 | 0.00 | 0.00 | 0.52 | 0.00 | 0.00 | 0.00 | 0.00 | 0.52 |
| 22 | 1.96 | 0.00 | 0.00 | 0.00 | 0.00 | 0.00 | 0.00 | 0.52 | 0.00 | 0.00 | 0.00 | 1.96 | 0.52 |
| 23 | 2.31 | 0.00 | 0.00 | 0.00 | 0.00 | 0.00 | 0.00 | 0.52 | 0.00 | 0.00 | 0.00 | 2.31 | 0.52 |
| 24 | 2.66 | 0.00 | 0.00 | 0.00 | 0.00 | 0.00 | 0.00 | 0.52 | 0.00 | 0.00 | 0.00 | 2.66 | 0.52 |
| 25 | 8.00 | 0.00 | 0.00 | 0.00 | 0.00 | 0.00 | 0.00 | 0.89 | 0.00 | 0.00 | 0.00 | 8.00 | 0.89 |
| 26 | 11.00 | 0.00 | 0.00 | 0.00 | 0.00 | 0.00 | 0.00 | 0.89 | 0.00 | 0.00 | 0.00 | 11.00 | 0.89 |
| 27 | 0.02 | 0.00 | 0.00 | 0.00 | 0.81 | 1.21 | 0.00 | 0.00 | 0.00 | 0.09 | 0.00 | 2.03 | 0.09 |
| 28 | 0.00 | 2.00 | 0.00 | 0.00 | 0.00 | 0.00 | 0.00 | 0.95 | 0.00 | 0.00 | 0.00 | 2.00 | 0.95 |
| 29 | 0.00 | 0.00 | 2.20 | 0.00 | 0.00 | 0.00 | 0.00 | 0.85 | 0.00 | 0.00 | 0.00 | 2.20 | 0.85 |
| 30 | 0.00 | 0.00 | 0.00 | 1.95 | 0.00 | 0.00 | 0.00 | 0.80 | 0.00 | 0.00 | 0.00 | 1.95 | 0.80 |
| 31 | 2.20 | 0.00 | 0.00 | 0.00 | 0.00 | 0.00 | 0.00 | 0.00 | 0.75 | 0.00 | 0.00 | 2.20 | 0.75 |

TABLE 2

| Sample No. | D50 nm | D90 nm | εS — | tanδ % | IR MΩ | TC (−25° C.) % | TC (+85° C.) % | VC (220 V) — | VC (1500 V) — |
|---|---|---|---|---|---|---|---|---|---|
| 1 | 1057 | 1569 | 3341 | 1.30 | 4.1E+05 | −0.8 | −9.1 | 35% | 74% |
| 2 | 1003 | 1249 | 3869 | 1.17 | 6.0E+05 | −2.9 | −9.5 | 49% | 98% |
| 3 | 963 | 1556 | 3007 | 0.72 | 4.5E+05 | −5.7 | −3.5 | 40% | 80% |
| 4 | 859 | 1468 | 3458 | 1.45 | 4.2E+05 | −6.6 | −1.5 | 40% | 79% |
| 5 | 715 | 1013 | 3769 | 0.86 | 5.0E+05 | −4.3 | −6.8 | 19% | 47% |
| 6 | 744 | 1096 | 4186 | 0.79 | 3.4E+05 | −4.3 | −9.2 | 17% | 64% |
| 7 | 592 | 817 | 3998 | 1.02 | 5.9E+05 | −6.3 | −7.9 | 17% | 67% |
| 8 | 583 | 865 | 3294 | 0.80 | 4.3E+05 | −4.1 | −4.3 | 16% | 50% |
| 9 | 533 | 756 | 3318 | 0.89 | 5.2E+05 | −4.0 | −7.4 | 14% | 44% |
| 10 | 329 | 427 | 3061 | 0.90 | 8.5E+05 | −3.4 | −15.8 | 10% | 26% |
| 11 | 815 | 1219 | 4009 | 2.42 | 1.3E+05 | 7.3 | −30.6 | 30% | 37% |
| 12 | 592 | 880 | 3900 | 0.93 | 3.8E+05 | −7.6 | −3.6 | 16% | 67% |
| 13 | 600 | 892 | 3695 | 0.84 | 5.6E+05 | −8.6 | −0.8 | 15% | 66% |
| 14 | 587 | 872 | 4084 | 1.43 | 3.4E+05 | −13.0 | −6.2 | 20% | 67% |
| 15 | 593 | 882 | 3368 | 1.20 | 3.0E+05 | −10.9 | −3.0 | 18% | 70% |
| 16 | 588 | 874 | 3679 | 0.86 | 2.1E+05 | −5.0 | −7.3 | 20% | 55% |
| 17 | 835 | 1249 | 3688 | 0.82 | 2.2E+05 | −5.9 | −5.4 | 15% | 57% |
| 18 | 822 | 1229 | 3739 | 0.74 | 1.5E+05 | −6.2 | −3.6 | 15% | 62% |
| 19 | 828 | 1238 | 3738 | 0.58 | 1.0E+05 | −11.1 | 3.1 | 7% | 67% |
| 20 | 825 | 1234 | 3945 | 0.89 | 1.3E+05 | −15.4 | 6.2 | 24% | 67% |
| 21 | 810 | 1211 | 4634 | 0.95 | 1.0E+05 | −6.1 | −3.6 | 13% | 60% |
| 22 | 842 | 1260 | 3984 | 0.79 | 1.6E+05 | −5.6 | −4.2 | 14% | 67% |
| 23 | 838 | 1254 | 3829 | 0.84 | 1.5E+05 | −6.1 | −3.4 | 12% | 60% |
| 24 | 833 | 1246 | 3633 | 0.92 | 1.4E+05 | −5.8 | −3.3 | 13% | 51% |
| 25 | 812 | 1214 | 1803 | 1.54 | 1.3E+05 | −4.7 | −9.4 | 26% | 54% |
| 26 | 817 | 1222 | 1040 | 1.54 | 1.3E+05 | −4.7 | −9.4 | 26% | 54% |
| 27 | 780 | 1150 | 3641 | 0.97 | 3.8E+05 | −5.8 | −5.6 | 23% | 65% |
| 28 | 823 | 1231 | 4235 | 1.98 | 3.4E+05 | −3.2 | −10.2 | 22% | 60% |
| 29 | 833 | 1246 | 4105 | 1.94 | 3.0E+05 | −2.9 | −9.8 | 23% | 62% |
| 30 | 817 | 1222 | 4063 | 1.74 | 3.2E+05 | −3.3 | −9.6 | 19% | 59% |
| 31 | 824 | 1232 | 3937 | 2.04 | 2.3E+05 | −2.5 | −10.1 | 18% | 57% |

TABLE 3

| | Amount with respect to 100 parts by mol of "M" in terms of metal element | | | | |
|---|---|---|---|---|---|
| Sample No. | First subcomponent Nb Part by mol | Second subcomponent Sm Part by mol | Third subcomponent Mn/ (Fe + Mn) — | First subcomponent total Part by mol | Second subcomponent total Part by mol |
| 32 | 2.31 | 0.89 | 0.01 | 2.31 | 0.89 |
| 33 | 2.31 | 0.89 | 0.20 | 2.31 | 0.89 |
| 34 | 2.31 | 0.89 | 0.38 | 2.31 | 0.89 |
| 35 | 2.31 | 0.89 | 0.53 | 2.31 | 0.89 |
| 36 | 2.31 | 0.89 | 0.90 | 2.31 | 0.89 |

TABLE 4

| Sample No | D50 nm | D90 nm | εS — | tanδ % | IR MΩ | ACVB kV/mm | TC (−25° C.) % | TC (+85° C.) % | VC (220 V) — | VC (1500 V) — |
|---|---|---|---|---|---|---|---|---|---|---|
| 32 | 842 | 1260 | 3624 | 4.19 | 8.5E+01 | 6.2 | −8.4 | 5.8 | 53% | 57% |
| 33 | 811 | 1213 | 3771 | 2.10 | 1.2E+03 | 6.2 | −7.0 | −4.6 | 34% | 56% |
| 34 | 818 | 1223 | 3734 | 1.42 | 1.1E+04 | 6.4 | −3.3 | −6.6 | 25% | 57% |
| 35 | 820 | 1226 | 4189 | 1.98 | 3.8E+05 | 6.1 | −3.0 | −11.5 | 23% | 51% |
| 36 | 836 | 1251 | 4003 | 1.72 | 4.5E+05 | 4.2 | −2.6 | −8.2 | 23% | 52% |

60

According to Tables 1 and 2, it was confirmed that, when D50 of the main component grains was 960 nm or less and D90 of the main component grains was 1460 nm or less (Sample Nos. 5 to 31), voltage characteristics of capacitance were better than when D50 was 1057 nm and D90 was 1569 nm (Sample No. 1), when D50 was 1003 nm (Sample No. 2), when D50 was 963 nm and D90 was 1556 nm (Sample No. 3), and when D90 was 1468 nm (Sample No. 4).

According to Tables 1 and 2, it was confirmed that, when D50 of the main component grains was 330 to 960 nm and D90 of the main component grains was 1460 nm or less (Sample Nos. 5 to 9, 12 to 19, 21 to 25, and 27 to 31), temperature characteristics of capacitance were better than when D50 was 329 nm (Sample No. 10).

According to Tables 1 and 2, it was confirmed that, when D50 of the main component grains was 960 nm or less, D90 of the main component grains was 1460 nm or less, and the second subcomponent was included at 0.01 to 4 parts by mol in terms of a metal element (Sample Nos. 5 to 9, 12 to 19, 21 to 25, and 27 to 31), temperature characteristics of capacitance were better than when the second subcomponent was included at 4.10 parts by mol in terms of a metal element (Sample No. 11).

According to Tables 1 and 2, it was confirmed that, when D50 of the main component grains was 960 nm or less, D90 of the main component grains was 1460 nm or less, and the second subcomponent was included at 0.01 to 4 parts by mol in terms of a metal element (Sample Nos. 5 to 9, 12 to 19, 21 to 25, and 27 to 31), temperature characteristics of capacitance were better than when the second subcomponent was not included (Sample No. 20).

According to Tables 1 and 2, it was confirmed that, when D50 of the main component grains was 960 nm or less, D90 of the main component grains was 1460 nm or less, and the first subcomponent was included at 0 to 10 parts by mol in terms of a metal element (Sample Nos. 5 to 9, 12 to 19, 21 to 25, and 27 to 31), the relative permittivity was higher than when the first subcomponent was included at 11.00 parts by mol in terms of a metal element (Sample No. 26).

According to Tables 3 and 4, it was confirmed that, when the molar ratio (Mn/(Fe+Mn)) of Mn to the total of Fe and Mn was 0.18 to 0.65 (Sample Nos. 33 to 35), the insulation resistance was higher than when the molar ratio (Mn/(Fe+Mn)) was 0.01 (Sample No. 32).

According to Tables 3 and 4, it was confirmed that, when the molar ratio (Mn/(Fe+Mn)) of Mn to the total of Fe and Mn was 0.18 to 0.65 (Sample Nos. 33 to 35), the value of the AC breakdown electric field was higher than when the molar ratio (Mn/(Fe+Mn)) was 0.90 (Sample No. 36).

NUMERICAL REFERENCES

2 . . . ceramic capacitor
4 . . . protective resin
6, 8 . . . lead terminal
10 . . . dielectric layer
12, 14 . . . terminal electrode
20 . . . main component grain

What is claimed is:

1. A dielectric ceramic composition comprising main component grains having a perovskite structure represented by a formula $AMO_3$, wherein "A" includes Ba;
"M" includes Ti;
D50 of the main component grains is 960 nm or less;
D90 of the main component grains is 1460 nm or less;
the dielectric ceramic composition includes a first sub-component;
the first subcomponent includes Fe and Mn; and
the molar ratio (Mn/(Fe+Mn)) of Mn to the total of Fe and Mn in terms of the metal elements is 0.18 to 0.65.

2. The dielectric ceramic composition according to claim 1, wherein
D50 of the main component grains is 330 to 960 nm.

3. The dielectric ceramic composition according to claim 1, wherein
the dielectric ceramic composition comprises 0.01 to 4 parts by mol of a second subcomponent with respect to 100 parts by mol of "M" in terms of a metal element; and
the second subcomponent includes at least one selected from the group consisting of Sm, Nd, La, Dy, Ce, Pr, Eu, Y, Gd, Tb, Ho, Er, Tm, and Yb.

4. The dielectric ceramic composition according to claim 3, wherein
the second subcomponent includes at least one selected from the group consisting of Sm, Nd, La, Dy, Ce, Pr, and Eu.

5. The dielectric ceramic composition according to claim 3, wherein
the dielectric ceramic composition comprises 0.01 to 2 parts by mol of the second subcomponent with respect to 100 parts by mol of "M" in terms of a metal element.

6. The dielectric ceramic composition according to claim 1, wherein
the dielectric ceramic composition comprises 0 to 10 parts by mol of a first-third subcomponent with respect to 100 parts by mol of "M" in terms of a metal element; and
the third subcomponent includes at least one selected from the group consisting of Nb, Ta, Mo, W, Sn, Bi, and Mg.

7. The dielectric ceramic composition according to claim 6, wherein
the third subcomponent includes at least one selected from the group consisting of Nb, Ta, Mo, W, Sn, and Bi.

8. A single layer capacitor comprising a dielectric layer including the dielectric ceramic composition according to claim 1.

* * * * *